United States Patent [19]
Hautier

[11] 3,854,753
[45] Dec. 17, 1974

[54] DEVICE FOR FIXING A GEAR-CHANGER ON A FRAME OF CYCLES

[75] Inventor: Claude Hautier, Chinois Nantes, France

[73] Assignee: Micmo S.A., Machecoul, France

[22] Filed: Jan. 8, 1973

[21] Appl. No.: 322,023

[52] U.S. Cl. .............................. 280/236, 74/217 B
[51] Int. Cl............................................ B62m 25/00
[58] Field of Search .......... 280/236, 237, 238, 288; 74/217 B

[56] References Cited
UNITED STATES PATENTS
2,839,939   6/1958   Juy.................................. 74/217 B FOREIGN PATENTS OR APPLICATIONS
634,107   2/1962   Italy..................................... 280/288
982,986   2/1965   Great Britain...................... 280/236

Primary Examiner—David Schonberg
Assistant Examiner—Terrance L. Siemens
Attorney, Agent, or Firm—Bacon & Thomas

[57] ABSTRACT

Device for fixing on a frame of a cycle a gear-changer which may be of various types. The device comprises a bracket which has an opening and peripheral abutment appendages, the latter being positioned in such a way that any one of them does not hinder the use of the others, whatever may be the type of the gear-changer used.

4 Claims, 8 Drawing Figures

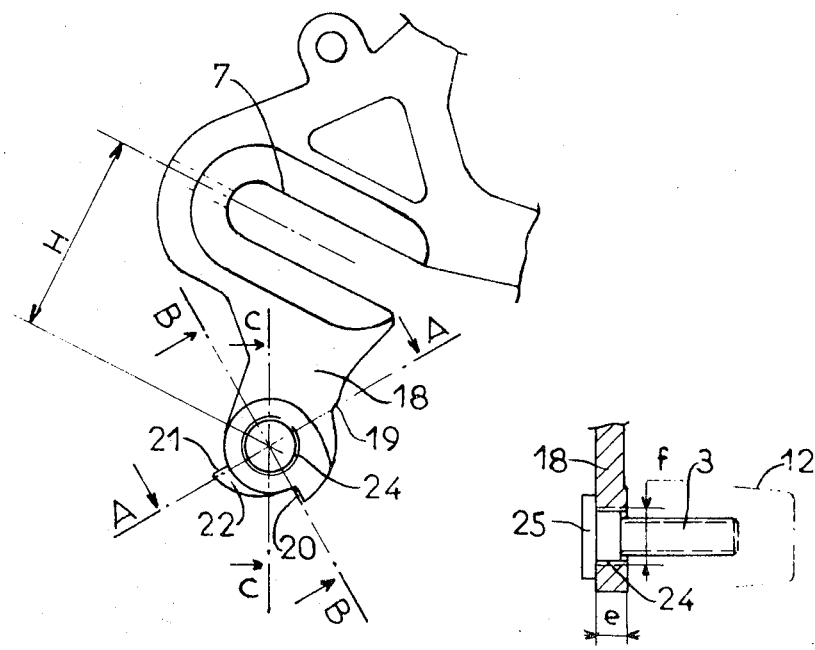
fig. 1
fig. 4
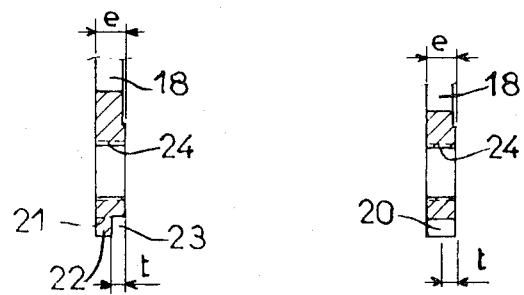
fig. 2
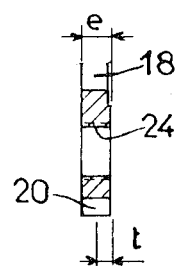
fig. 3

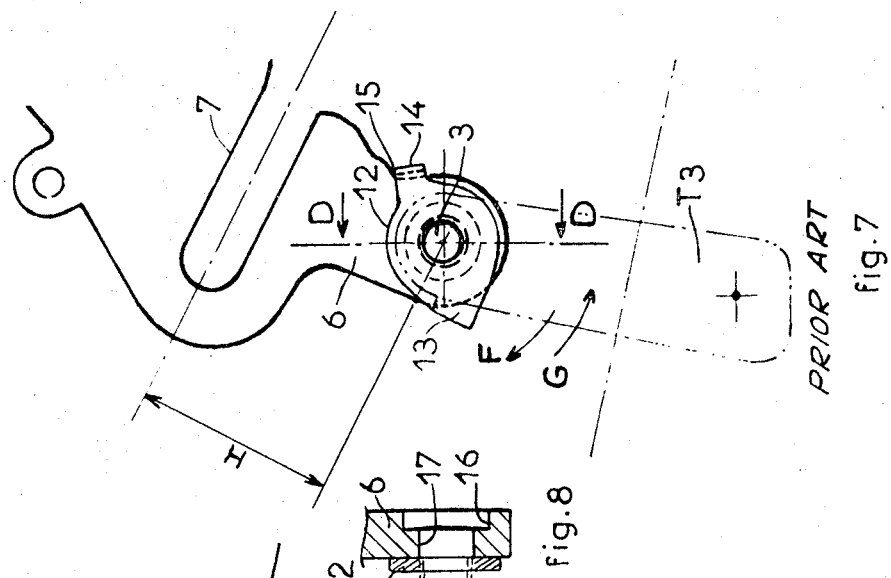
fig. 5 PRIOR ART
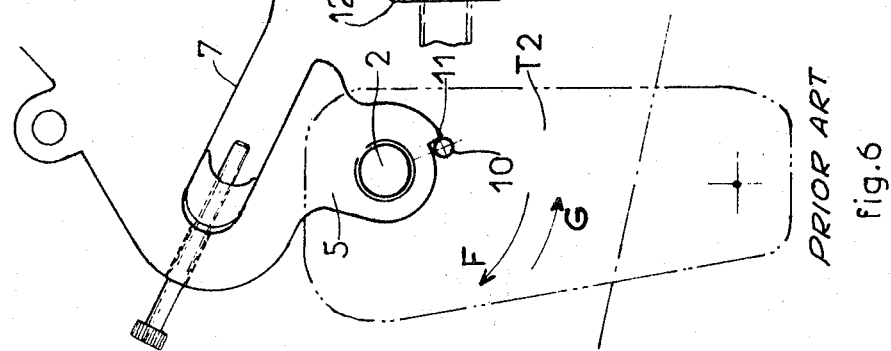
fig. 6 PRIOR ART
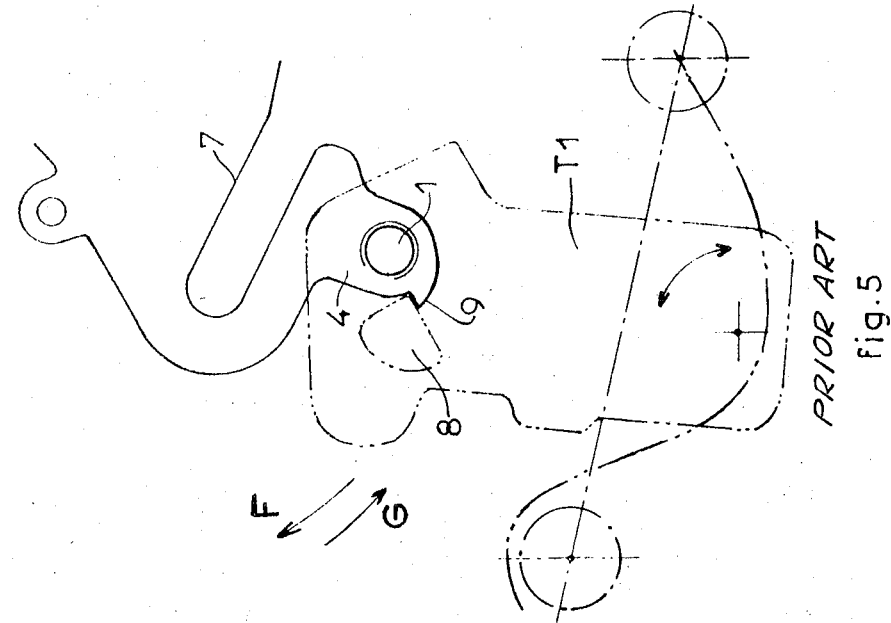
fig. 7 PRIOR ART
fig. 8

DEVICE FOR FIXING A GEAR-CHANGER ON A FRAME OF CYCLES

The present invention relates to cycles, more particularly, to the lower and rear part of the frame of a bicycle close to the place where the rear wheel is fixed.

At this place, under the customary notch or the slot in which each end of the wheel axle is secured, an appendage, hereafter called bracket, permits the suspension of a gear-changer. A gear-changer is understood to be an articulated apparatus which is used for tightening the chain and at the same time for changing the gear by providing the passage of the chain from one rear sprocket wheel onto another coaxial sprocket wheel. The latter varies according to different manufacturers. The appendage or bracket varies in its shape and size according to different types of gear-changers. Among the latter, there is a class the suspension of which is insured by an axle fixed in a hole or opening provided in the bracket. The gear-changer can swing around the axle. In one direction, its pivoting is limited by means of a stop element, which varies in shape, size and position, according to different manufacturers. There are, therefore, several ways of attaching or fixing which require different characteristics of the bracket which is integral with the frame. Thus, the suspension hole or opening, the articulation means, the pivoting stop elements, vary according to the bracket adapted to receive any of currently used types of gear-changers.

By way of example, three types of gear-changers will be examined hereinbelow. These types being designed as T1, T2, T3. Each bracket corresponding to each of these types is described and represented in a figure before the description of the invention is given.

The main drawback of the present state of the technique in this field, is that the gear-changers which are of different types are not interchangeable. Therefore, the manufacturer of a frame is forced to manufacture several types or models (at least three) because of the difference existing between the brackets. This fact leads to complication and additional investment for mass production.

The device according to the present invention overcomes this drawback. In fact, according to the invention, several types of gear-changers of the same class (suspension by axle and possibility of swinging) may be mounted on the same type of frame thanks to the new features of the bracket according to the invention. The functional advantages of each model or type is preserved and mass protection is simplified.

The device according to the present invention is characterized by the shape of a bracket which has a hole or opening and peripheral appendages, correctly machine finished, for permitting the receiving and adjustment of any of the different types of gear-changers above mentioned.

Other features and characteristics of the invention will become apparent as the description proceeds.

The invention will be better understood by the description with follows which is not to be taken in any limitative way. In order to give a better explanation, the first part of the description will summarize the main types of gear-changers (the three types, T1, T2, T3, taken as examples) and their adjustment on the known different brackets.

Drawings are attached to better illustrate the invention. In the drawings:

FIG. 1 is a side view of the lower part of a frame with a bracket according to the invention.

FIG. 2 is a partial sectional view along line A—A of the bracket shown in FIG. 1.

FIG. 3 is a partial sectional view along line B—B of the bracket shown in FIG. 1.

FIG. 4 is an assemblage of a support axle of a gear-changer of type T3 hereafter described.

FIGS. 5, 6, and 7 are side views of the known brackets for fixing three types of gear-changers, T1, T2, T3 successively. The gear-changers are shown in broken line.

FIG. 8 is a sectional view along line D—D of the suspension hole of the bracket of a gear-changer of the type T3.

Referring now to the drawings, a gear-changer generally comprises a body provided at its lower part with two (or one) idlers for tightening a chain, the idlers being mounted on an articulated lever against the action of a spring. Furthermore the idlers are capable of a transverse displacement perpendicular to the plane of the chain. Thus, the chain may jump from one sprocket wheel to the other under the lateral thrust of one or several fork elements moving with the idlers.

FIGS. 5, 6 and 7 show the mounting on a frame of typical prior art gear changers. The body of the gear-changer T1 or T2 or T3, taken as an example, is suspended at its upper part, by an axle (1 or 2 or 3 according to the type) fixed in a hole or opening provided in the bracket (4, 5, or 6) which is integral with the frame. The bracket is welded on the frame, under the slot 7 where the ends of the support axle of the rear wheel are pressed and secured.

The mounting of the body of the gear-changer is different according to the different type. The brackets 4, 5, or 6 do not have the same characteristics, thus making impossible any interchangeability of the different types of gear-changers.

The object of the present invention is the provision of a simple bracket which is adapted to receive any type of gear-changer.

For a better understanding the known brackets 4, 5, and 6, used up to present on the frames of cycles will be described first.

According to the type T1 (FIG. 5) the body of the gear-changer may swing around an axle 1 in the direction of arrow F, under the influence of an exceptional or outside effort, be it at stop or in movement, permitting, for example, the temporary relieving of the tightening of the chain. In the direction of the arrow G, the body is in an abutting position, during the motion of the cycle. The body abuts by means of boss or knob 8, pending from the body of the gear-changer, on an undercut provided on the periphery of the bracket 4, at a rear part of the bracket. The axle 1 is screwed in the threaded bore of the bracket.

According to the type T2 (FIG. 6) the body of the gear-changer is provided with a pin 10 which has a limited length t. Pin 10 abuts, during the normal motion (according to arrow G) on a stop element or abutment 11 pending from the entire thickness of bracket 5, at the forward lower part of the bracket. The axle 2 is screwed in a threaded bore with a flat locking nut, provided at the inner side of the bracket.

According to the type T3 (FIG. 7) the gear-changer is provided at its upper part with an element 12 rigidly secured on the bracket 6 by means of the suspension axle 3 of the gear-changer. The body T3 of the gear-changer is articulated around element 12. It is urged back in the direction of arrow F by means of a spring abutting against the stop element 13 integral with element 12. The body T3 may, under an exceptional or outside effort, swing in the direction of arrow G by compressing its spring which abuts against element 12. The element 12 is maintained in position, under the influence of a torque thus created, by means of a spline or tongue 14 which abuts on a slight corner 15 provided on the periphery of the bracket 6, and at the upper forward part thereof. According to this type, the axle 3 is provided with a head which is engaged in a counterbore 16 concentric with the hole 17 provided in the bracket 6 (FIG. 8). The axle 3 is screwed in the element 12, but is provided with a smooth part which is fit in the hole 17.

The device according to the present invention is characterized by the bracket 18 (FIG. 1) being provided on its periphery with means cooperating with each gear changer.

At its upper front part it is provided with an undercut 19 adapted to receive the curved tongue 14 of the gear-changer of the type T3. Said undercut extends over the whole thickness of bracket 18 as in the case of the bracket 6 above mentioned for this type of gear-changers.

At the lower part, a catch or notch 20, extends over the whole thickness of the bracket (section BB, FIG. 3). The pin 10 of the gear-changer of the type T2 abuts in the normal motion of the cycle, in the notch 20 in the same way as the stop element 11 provided on the bracket 5, above mentioned. It is to be noted that pin 10 which has a limited length t, uses only a part of the surface of the notch 20.

At the lower rear part, a catch or notch 21 is made on a crest 22 as shown in FIGS. 1 and 2 (section AA). Notch 21 is for the abutment of a gear-changer of the type T1, which has been described earlier. The stop element 8 of the latter type abuts against this notch. The crest 22 extends only on a part of the thickness of the bracket 18. The groove 23 permits the pin 10 to freely pass in the case of the use of a gear-changer of the type T2.

The opening or hole 24 of the bracket 18 is threaded. Its inner diameter (at the crest of the threads) substantially corresponds to the smooth part of the axle 3 which serves for fixing gear-changers of the type T3 (FIG. 4). The head 25 of the axle abuts against the inner surface of the bracket without a plate. The axle 3 is centered by the threads of the threaded hole 24. The diameter of the threads f of the hole 24 corresponds to the diameter of the axles 1 and 2 for fixing gear-changers of the types T1 and T2, respectively. Thus, the fixing or attachment of the gear-changer is possible whatever may be its type. It is even possible to lock the axle 2 of the gear-changer T2 by means of a flat nut on the inner face of the bracket, in the same manner as it is possible to do with the bracket already known of the type T2 above mentioned. By this fact, the thickness e of the new bracket 18 is not greater than the thickness of the bracket 5.

It is thus shown that each type of gear-changer may be mounted on a same bracket 18, and be in normal operation thanks to the described features provided in the bracket 18.

The dimension H of the device according to the invention (the distance between the suspension hole to the axle of the rear wheel) is the same as the distance which is necessary for the bracket 6 (of the type T3).

The other types of gear-changers work perfectly with this distance notwithstanding the fact that the brackets 4 and 5 are slightly shorter.

The invention is not limited to the embodiment above described. It covers all the embodiments within the scope of the claims.

Thus, the way of fixing the bracket 18 may vary and the form of the crest provided between elements 21, 20 and 19 may be slightly different from the form indicated in the FIG. 1.

The device according to the invention is applied to the frames of cycles provided with gear-changers.

It is to be noted that the element 14 of FIG. 7 is a greater distance from the center of shaft 3 than is the stop shoulder 11 of FIG. 6. Thus, 14 may swing past shoulder 11 without interference therefrom. In like manner the stop means 10 of FIG. 6 is farther from the center of shaft 2 than the nose of stop means 8 of FIG. 5 is from the center of shaft 1. As shown in FIG. 2, the projection 22, corresponding to shoulder 9 of FIG. 5, is cut away to permit the short pin 10 of FIG. 6 to move therepast without interference. It is to be noted that none of the shoulders 19, 20 or 21 of FIG. 1 interferes with the stop means of any other gear changer, the latter may swing in a clockwise direction to loosen their respective chains without interference.

I claim:

1. Bracket means on a cycle frame for supporting any of a plurality of different gear changers for pivotal movement thereon and having stop means for limiting pivoting of the gear changers in one direction;
   said bracket means having an opening for pivotally supporting said gear changers; and
   a plurality of stop shoulders on said bracket, angularly spaced about said opening and each being positioned to cooperate with the stop means on only one of different gear changers.

2. A bracket as defined in claim 1 wherein one of said stop shoulders is provided with a cut-away portion on one side thereof for passage therepast of the stop means on one type of gear changer cooperable with an adjacent shoulder.

3. A bracket as defined in claim 1 wherein said opening is a threaded opening for threadedly mounting pivot axles of certain gear changers and wherein the inner diameter of said threads is substantially equal to the diameter of a pivot axle of another gear changer.

4. A bracket as defined in claim 1 wherein said shoulders are at a different distance from the center of said opening, each shoulder facing toward an adjacent shoulder that is nearer to said opening.

* * * * *